(12) United States Patent
Okuno

(10) Patent No.: US 6,963,695 B2
(45) Date of Patent: Nov. 8, 2005

(54) OPTICAL COMMUNICATION SYSTEM AND METHOD OF ASSIGNING SIGNAL CHANNELS

(75) Inventor: Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 562 days.

(21) Appl. No.: 09/726,380

(22) Filed: Dec. 1, 2000

(65) Prior Publication Data
US 2002/0163698 A1 Nov. 7, 2002

(30) Foreign Application Priority Data
Dec. 3, 1999 (JP) .............................. P11-344768

(51) Int. Cl.⁷ ............................................ H04B 10/12
(52) U.S. Cl. ...................... 398/147; 398/79; 398/81; 398/82; 398/83; 398/140; 398/141; 398/148; 398/158; 385/24; 385/27; 385/15; 385/37
(58) Field of Search ............................. 398/79, 81, 82, 398/83, 140, 141, 147, 148, 158; 385/24, 385/15, 27, 37

(56) References Cited

U.S. PATENT DOCUMENTS 5,903,371 A   5/1999 Arecco et al.
5,978,131 A * 11/1999 Lauzon et al. .............. 359/341
6,229,935 B1 * 5/2001 Jones et al.

FOREIGN PATENT DOCUMENTS

JP   9-172449   6/1997
JP   10-13356   1/1998

* cited by examiner

Primary Examiner—Hanh Phan
(74) Attorney, Agent, or Firm—McDermott Will & Emery LLP

(57) ABSTRACT

The present invention relates to an optical communication system including a structure for suppressing deterioration of transmission characteristics of signals added at each of nodes arranged in an optical transmission line, and a method of assigning signal channels. The optical communication system includes the optical transmission line for transmitting signals of plural channels between a transmitter and a receiver, and one or more nodes are arranged at predetermined positions of the optical transmission line. Each of the nodes includes an ADM for adding signals of a predetermined channel to the optical transmission line, and a signal channel at which the absolute value of accumulated-dispersion up to the receiver becomes smallest among signal channels which can be added is assigned to each of the nodes in advance or dynamically.

6 Claims, 11 Drawing Sheets

OPTICAL COMMUNICATION SYSTEM AND METHOD OF ASSIGNING SIGNAL CHANNELS

BACKGROUND OF THE INVENTION

1. Field of the Invention

The present invention relates to a method of assigning signal channels which assigns a signal channel to be added to every node, which is arranged at a predetermined position on an optical transmission line and adds signals of a predetermined channel to the optical transmission line, and an optical communication system including nodes each adding signals of a channel assigned by this assigning method to the optical transmission line.

2. Related Background Art

In a wavelength division multiplexing (WDM: wavelength Division Multiplexing) optical communication system for transmitting signals having wavelengths different from each other, at a node provided on an optical transmission line, there is a case where signals of a predetermined wavelength (predetermined channel) is dropped (received by the node and is not transmitted to a downstream optical transmission line), or signals of a predetermined channel is added (transmitted from the node and is not transmitted to a downstream optical transmission line). An optical communication system for adding signals of a predetermined channel to an optical transmission line from a node is disclosed in, for example, Japanese Patent Laid-Open No.13356/1998, No.172449/1997, and the like.

SUMMARY OF THE INVENTION

The present inventors reviewed the above prior art and consequently found problems as set forth below. Namely, in general, dispersion of an optical transmission line has wavelength dependency, and according to an added signal wavelength, there is a case where accumulated-dispersion at a receiving end reaches such a level as to have a bad influence on transmission characteristics. Particularly, due to a high-speed transmission, a difference between wavelengths (difference between channels) in the influence of accumulated-dispersion becomes more remarkable. If a dispersion compensator for compensating the dispersion is individually introduced with respect to added signals in order to compensate this, manufacturing cost of the optical communication system is increased and enlargement of an apparatus is caused.

The present invention has been made to solve the above problems, and has an object to provide an optical communication system including a structure which can suppress the manufacturing cost to be low while suppressing deterioration of transmission characteristics of signals added to an optical transmission line from each node, and a signal channel assigning method.

An optical communication system according to the present invention comprises an optical transmission line disposed between a transmitting end and a receiving end, for transmitting signals of plural channels, and one or more nodes each arranged at a predetermined position of the optical transmission line and adding signals of a predetermined channel to the optical transmission line. A signal channel assigning method according to the present invention assigns optimum signal channels to one or more nodes respectively in advance or dynamically. Specifically, to each of the nodes, among signal channels which can be added to the optical transmission line, a signal channel at which the absolute value of accumulated-dispersion from the node itself to the receiving end becomes smallest is assigned in advance or dynamically. In particular, in the case where a plurality of nodes are arranged on the optical transmission line, it is preferable that wavelength dependency of accumulated-dispersion up to the receiving end is calculated for each of the nodes in advance, and the optimum signal channels are assigned in advance or dynamically to the nodes in descending order of the absolute value of the accumulated-dispersion.

As described above, for each of the nodes disposed on the optical transmission line in the optical communication system and assigned with the optimum signal channel, it becomes possible to add signals by which the absolute value of the accumulated-dispersion from the node to the receiving end becomes smallest among signal channels which can be added to the optical transmission line, to the optical transmission line. Thus, in accordance with the optical communication system and the signal channel assigning method, the transmission characteristics of the signals added at each of the nodes are excellent as compared with a case where any one of other signal channels is selected.

Incidentally, in the optical transmission line in which a signal transmission path is fixed, although a desired optical communication system is realized by providing signal sources (light sources) outputting signals of previously assigned channels to corresponding nodes respectively, it is also conceivable that a transmission path varies for every signal channel. In the latter case, it is necessary that a tunable light source, a plurality of light sources outputting wavelengths different from each other, or a single light source simultaneously outputting signals of plural channels is prepared at each of the nodes in advance, and an optimum signal channel is assigned to each of the nodes dynamically.

Like this, in the case where the optimum signal channel is assigned to each of the nodes dynamically, each of the nodes preferably includes a node control system specifying signal channels which can be added to the optical transmission line, and assigning a signal channel at which the absolute value of the accumulated-dispersion from the associated node to the receiving end becomes smallest to the node, among these specified signal channels.

On the other hand, in the case where the optimum signal channel is assigned to each of the nodes dynamically in predetermined order, the optical communication system preferably includes a centralized control system calculating wavelength dependency of accumulated-dispersion up to the receiving end for each of the nodes, and assigning optimum signal channels to the nodes in descending order of the absolute value of the accumulated-dispersion. Incidentally, in this centralized control system, as a method of assigning signal channels according to the present invention, signal channels which can be added to the optical transmission line are specified for the respective nodes selected in the predetermined order, and among these specified signal channels, a signal channel at which the absolute value of the accumulated-dispersion from the selected node to the receiving end becomes smallest is assigned to the selected node.

Besides, the optical communication system according to the present invention may include a dispersion compensator provided at predetermined position on the optical transmission line. When the dispersion compensator is provided, although the power of signals added to the node relatively far from the receiving end is reduced to some degree before the signals reach the receiving end, since the absolute value of the accumulated-dispersion up to the receiving end is small, a sufficient reception margin can be secured. On the contrary, since signals added to the node relatively close to the receiving end has sufficient power even at the point of time when the signals reach the receiving end, even if the absolute value of the accumulated-dispersion up to the receiving end is relatively large, a sufficient reception margin can be secured.

DESCRIPTION OF THE PREFERRED EMBODIMENTS

Respective embodiments of an optical communication system and a signal channel assigning method according to the present invention will be hereinafter described with reference to FIGS. 1–3, 4A, 4B, and 5–11. Incidentally, in the explanation of the drawings, the same elements are designated by the same characters and duplicate explanation is omitted.

(First Embodiment of an Optical Communication System and a Method of Assigning Signal Channels)

Figure 1:
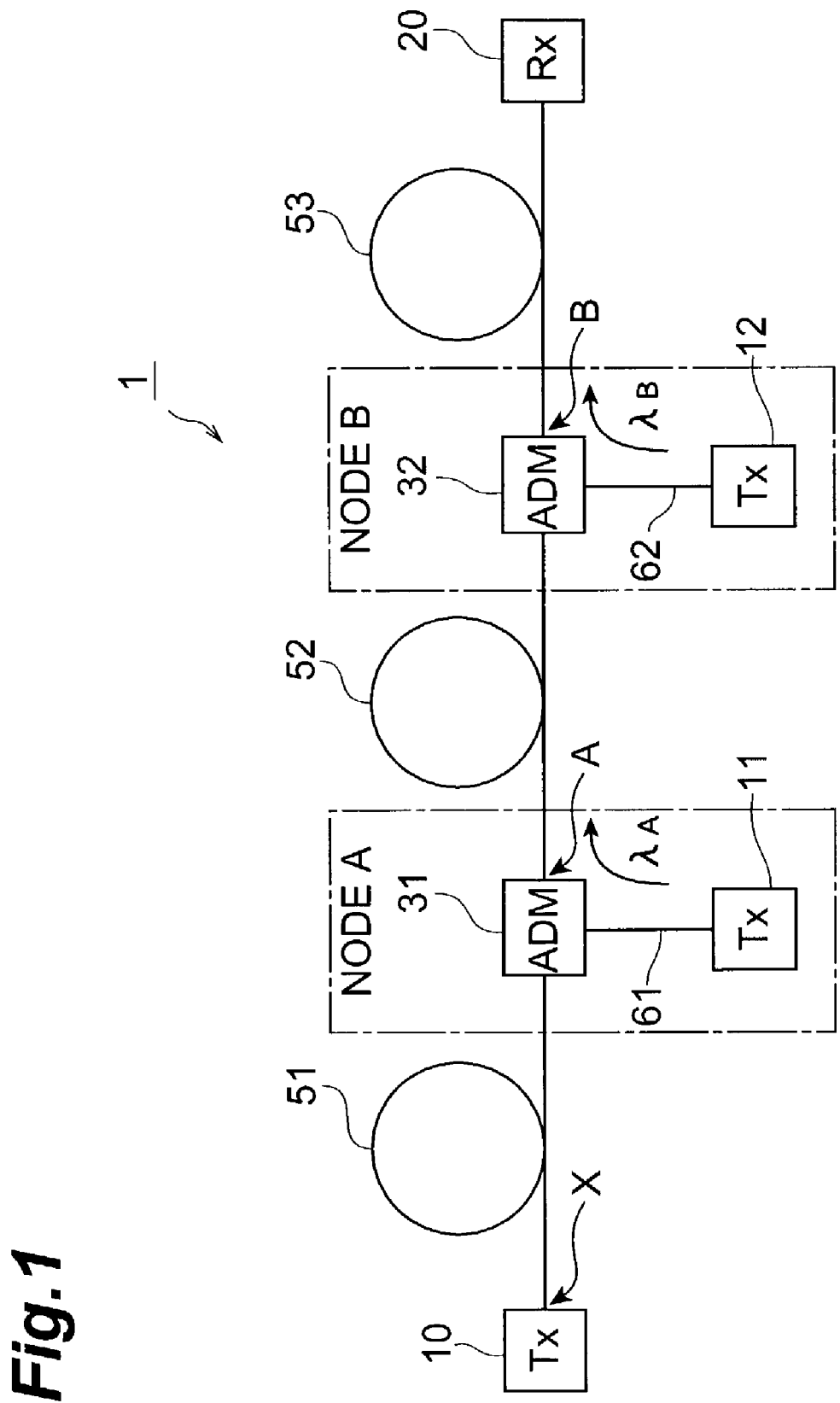
FIG. 1 is a view showing a structure of a first embodiment of an optical communication system according to the present invention.

FIG. 1 is a view showing a structure of a first embodiment of an optical communication system according to the present invention, and in the structure shown in FIG. 1, a transmission path of signal is fixed, and an optimum signal channel is previously assigned to each of nodes A and B which add signals of predetermined channels to an optical transmission line.

In an optical communication system 1 according to the first embodiment, the nodes A and B are arranged on the optical transmission line provided between a transmitter 10 and a receiver 20. The node A includes an ADM (Add Drop Multiplexer) 31 and a light source 11 for transmitting signals of the previously assigned optimum channel through the ADM 31 to the optical transmission line. Similarly, the node B includes an ADM 32 and a light source 12 for transmitting signals of the previously assigned optimum channel through the ADM 32 to the optical transmission line. An optical fiber 51 is provided between the transmitter 10 and the ADM 31, an optical fiber 52 is provided between the ADM 31 and the ADM 32, an optical fiber 53 is provided between the ADM 32 and the receiver 20, and the optical transmission line from the transmitter 10 to the receiver 20 is constituted by these optical fibers 51 to 53. Besides, an optical fiber 61 is provided between the light source 11 and the ADM 31, and an optical fiber 62 is provided between the light source 12 and the ADM 32.

In the optical communication system 1 according to the first embodiment, the signals outputted from the transmitter 10 propagate through the optical fibers 51 to 53 in sequence and reach the receiver 20. Alternatively, there is also a case where the signal outputted from the transmitter 10 is dropped by the ADM 31 or the ADM 32, and is received by a receiver (not shown). At the node A, the signals outputted from the light source 11 propagate through the optical fiber 61 and reach the ADM 31, and they are sent from the ADM 31 to the optical fiber 52. Then, the signals from the light source 11 propagate through the optical fibers 52 and 53 in sequence and reach the receiver 20. On the other hand, at the node B, the signals outputted from the light source 12 propagate through the optical fiber 62 and reach the ADM 32, and they are sent from the ADM 32 to the optical fiber 53. Then, the signals from the light source 12 propagate through the optical fiber 53 and reach the receiver 20.

As each of the optical fibers 51 to 53, a single mode optical fiber having a zero dispersion wavelength near a wavelength of 1.3 $\mu$m, a dispersion compensating optical fiber for compensating chromatic dispersion of the single-mode optical fiber at a wavelength of 1.55 $\mu$m band, a dispersion-shifted optical fiber having a zero dispersion wavelength near a wavelength of 1.55 $\mu$m, or the like can be applied. From the viewpoint of enabling these silica-based optical fibers to transmit at the lowest loss and the viewpoint of easiness of loss compensation by an optical amplifier, it is preferable that each of the transmitter 10 and the light sources 11 and 12 outputs signals having a wavelength of 1.55 $\mu$m band.

Figure 2:
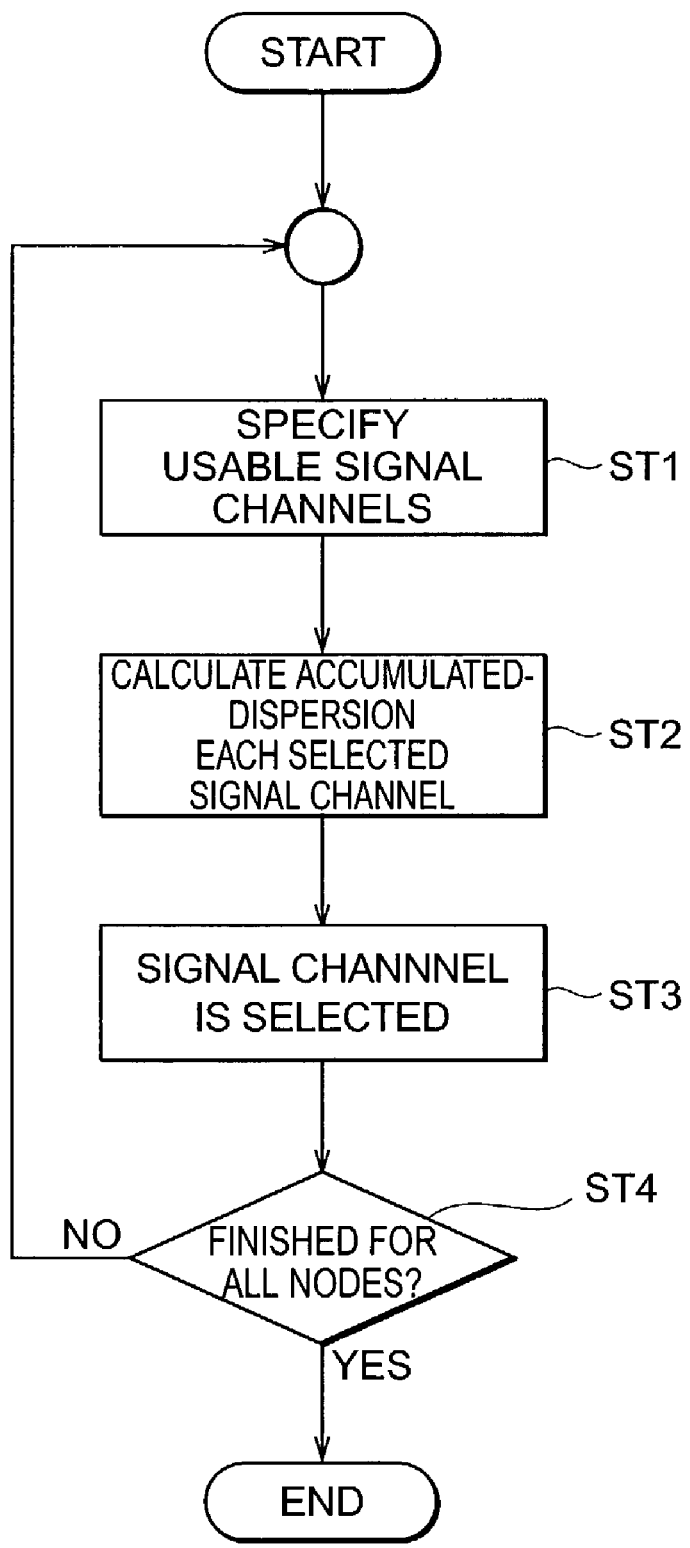
FIG. 2 is a flowchart for explaining a first embodiment of a method of assigning signal channels according to the present invention.
Figure 3:
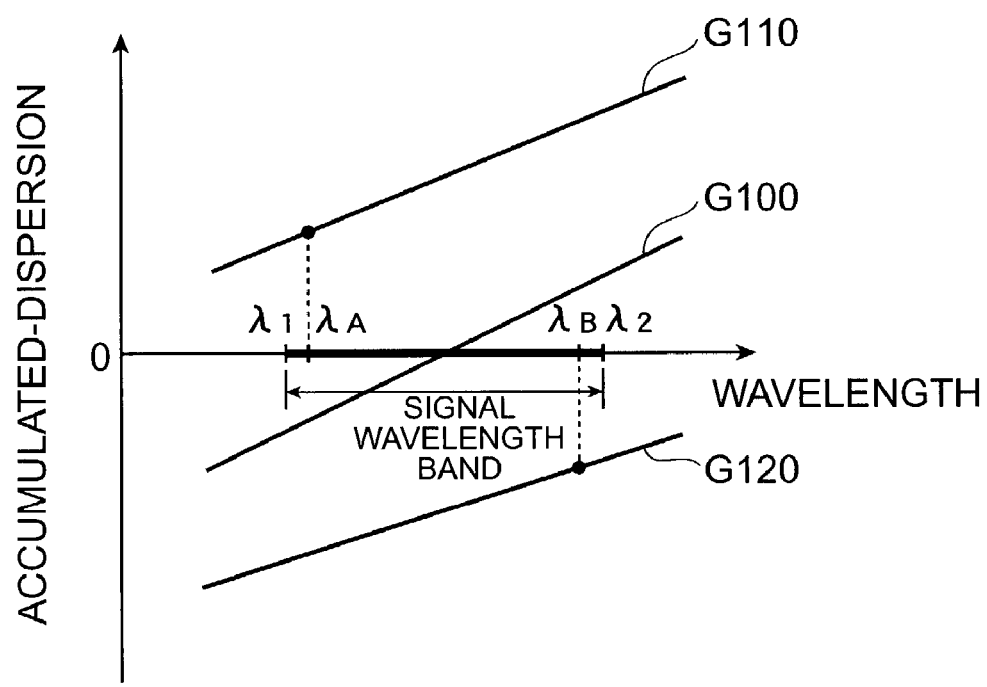
FIG. 3 is a graph for supplementally explaining the signal channel assigning method according to the first embodiment.

Incidentally, in FIG. 1, point X indicates a position of an output end in the transmitter 10, point A indicates a position of an output end in the ADM 31, and point B indicates a position of an output end in the ADM 32. FIGS. 2 and 3 are a flowchart and a graph for explaining a signal channel assigning method (first embodiment of a signal channel assigning method according to the present invention) in the optical communication system 1 according to the first embodiment. In particular, in the graph shown in FIG. 3, a signal wavelength band is $\lambda_1$–$\lambda_2$, a curve G100 indicates wavelength dependency of accumulated-dispersion from the point X to the receiver 20, a curve G110 indicates wavelength dependency of accumulated-dispersion from the point A to the receiver 20, and a curve G120 indicates wavelength dependency of accumulated-dispersion from the point B to the receiver 20.

As shown in FIG. 3, in the optical communication system 1, optical fibers having suitable chromatic dispersion characteristics in the signal wavelength band ($\lambda_1$–$\lambda_2$) are applied as the optical fibers 51 to 53 constituting the optical transmission line. By this, the absolute value of accumulated-dispersion of the optical transmission line from the transmitter 10 to the receiver 20 becomes small, and deterioration of transmission characteristics of signals from the transmitter 10 to the receiver 20 is also effectively suppressed. However, the absolute value of accumulated-dispersion of the optical transmission line from the light source 11 through the ADM 31 to the receiver 20 is not necessarily small, and the absolute value of accumulated-dispersion of the optical transmission line from the light source 12 through the ADM 32 to the receiver 20 is also not necessarily small.

Then, in this first embodiment, a channel of signals outputted from the light source 11 and added through the ADM 31 to the optical transmission line is assigned to the node A in advance, and a channel of signals outputted from the light source 12 and added through the ADM 32 to the optical transmission line is assigned to the node B in advance, in accordance with the flowchart shown in FIG. 2.

First, in the signal channel assignment for node A, as channel candidates of signals outputted from the light source 11 and added through the ADM 31 to the optical transmission line, it is first necessary to specify signal channels which can be added by the ADM 31 (step ST1). Subsequently, accumulated-dispersion from the point A to the receiver 20 for each of the specified candidates is calculated (step ST2), and a signal channel (wavelength $\lambda_A$) at which the absolute value of the calculated accumulated-dispersion is smallest is selected as the signal channel to be added from the node A (step ST3). For example, as shown in FIG. 3, in the signal wavelength band, if both the accumulated-dispersion and dispersion slope from the point A to the receiver 20 are positive, the channel of the shortest wavelength among the channels which can be added by the ADM 31 is assigned as the channel (wavelength $\lambda_A$) of the signals outputted from the light source 11 and added through the ADM 31 to the optical transmission line. If the signals of the lower limit wavelength $\lambda_1$ of the signal wavelength band can be added through the ADM 31, $\lambda_A = \lambda_1$.

Similarly, in the signal channel assignment for the node B, first, as channel candidates of signals outputted from the light source 12 and added through the ADM 32 to the optical transmission line, signal channels which can be added through the ADM 32 are specified (step ST). Then, accumulated-dispersion from the point B to the receiver 20 is calculated for each of the specified candidates (step ST2), and a signal channel (wavelength $\lambda_B$) at which the absolute value of the calculated accumulated-dispersion is smallest is selected as the signal channel to be added from the node B (step ST3). For example, as shown in FIG. 3, in the signal wavelength band, if the accumulated-dispersion from the point B to the receiver 20 is negative and the dispersion slope is positive, the signal channel of the longest wavelength among the channels which can be added by the ADM 32 is assigned as the channel (wavelength $\lambda_B$) of the signals outputted from the light source 12 and added through the ADM 32 to the optical transmission line. If the signals of the upper limit wavelength $\lambda_2$ of the signal wavelength band can be added by the ADM 32, $\lambda_B = \lambda_2$.

The assignment of the optimum signal channel as described above is performed for all nodes (step ST4). In the foregoing signal channel assignment, to each of the nodes on the optical transmission line, among the signal channels which can be added, the signal channel at which the absolute value of the accumulated-dispersion from the node itself to the receiver 20 is smallest is assigned in advance as the channel of the signals outputted from the light source and added from the ADM to the optical transmission line. By this, transmission characteristics of the signals outputted from the respective light sources 11 and 12 in the respective nodes A and B and received by the receiver 20 are excellent as compared with the case where other signal channels are selected.

Figure 4B:
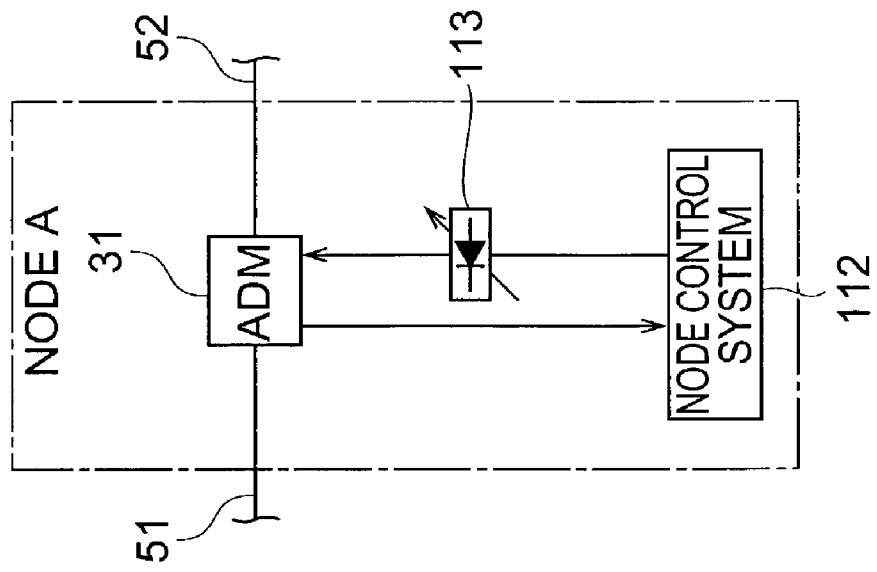
FIGS. 4A and 4B are views showing another structural examples of respective nodes.
Figure 4A:
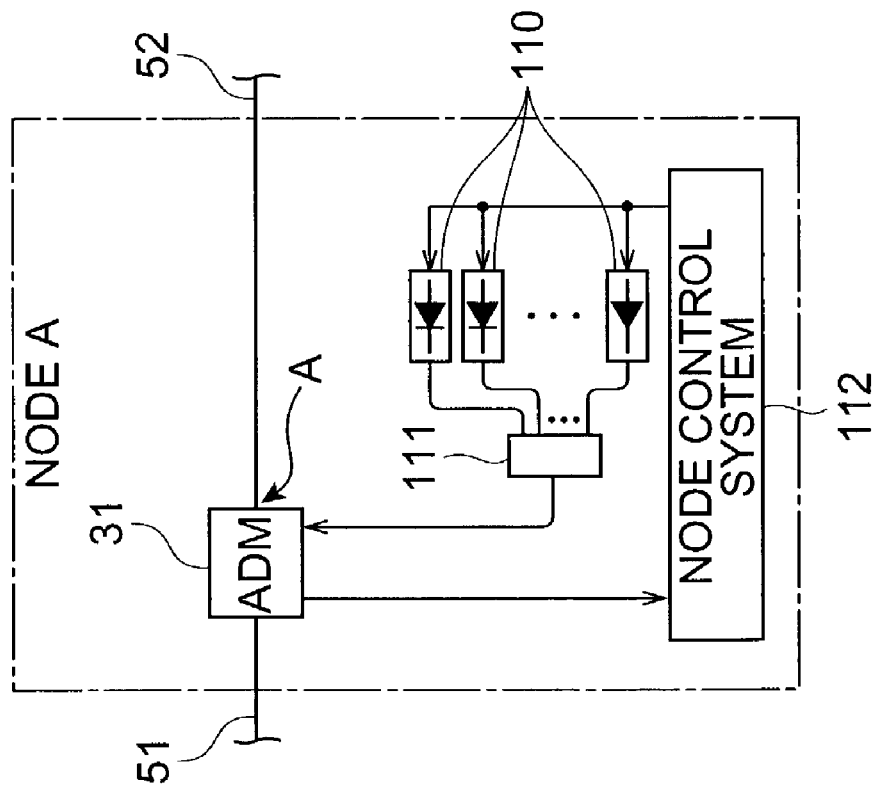

Incidentally, with respect to this first embodiment, in the above signal channel assignment, although it is assumed that the transmission path of signal is fixed, it is also conceivable that the transmission path varies for each signal channel. In the latter case, at each of the nodes, it is necessary to assign the optimum signal channel dynamically. FIGS. 4A and 4B show structures for assigning the optimum signal channel dynamically to each node. Incidentally, although these drawings show only the structure of the node A, the node B is also provided with the same structure as the node A.

In the first structure as shown in FIG. 4A, the node A includes an ADM 31, a plurality of light sources 110 for outputting signals having wavelengths different from each other, a multiplexer 111 for connecting the ADM 31 to the plurality of light sources 110 one-to-many, and a node control system 112 for selecting an optimum signal channel for the node A. AS shown in FIG. 2, from signals transmitted through the optical fiber 51 and having reached the ADM 31, the node control system 112 specifies signal channels which can be added from the node A (step ST1), and calculates the absolute value of accumulated-dispersion from the node A to the receiver 20 for these specified signal channels (step ST2). Subsequently, the node control system 112 selects a signal channel at which the absolute value of the calculated accumulated-dispersion is smallest (step ST3), and controls the driving of the light source to output signals of a wavelength corresponding to the selected signal channel. Incidentally, the foregoing assignment operation is the same with the node B.

On the other hand, in the second structure as shown in FIG. 4B, the node A includes an ADM 31, a tunable light source 113, and a node control system 112 for selecting an optimum signal channel for the node A. Also in this second structure, the node control system 112 performs the assignment operation as described above, and controls the tunable light source 113 to output signals of a wavelength corresponding to the selected signal channel (the same applies to the node B). Incidentally, the light source 113 may be a single light source for simultaneously outputting signals (having wavelengths different from each other) of plural channels.

As described above, by arranging the nodes having the structures as shown in FIGS. 4A and 4B at predetermined positions on the optical transmission line respectively, the optical communication system for assigning the optimum signal channel dynamically at each of the nodes can be realized.

(Second Embodiment of an Optical Communication System and a Signal Channel Assigning Method)

A second embodiment of an optical communication system and a signal channel assigning method according to the present invention will next be described.

Figure 5:
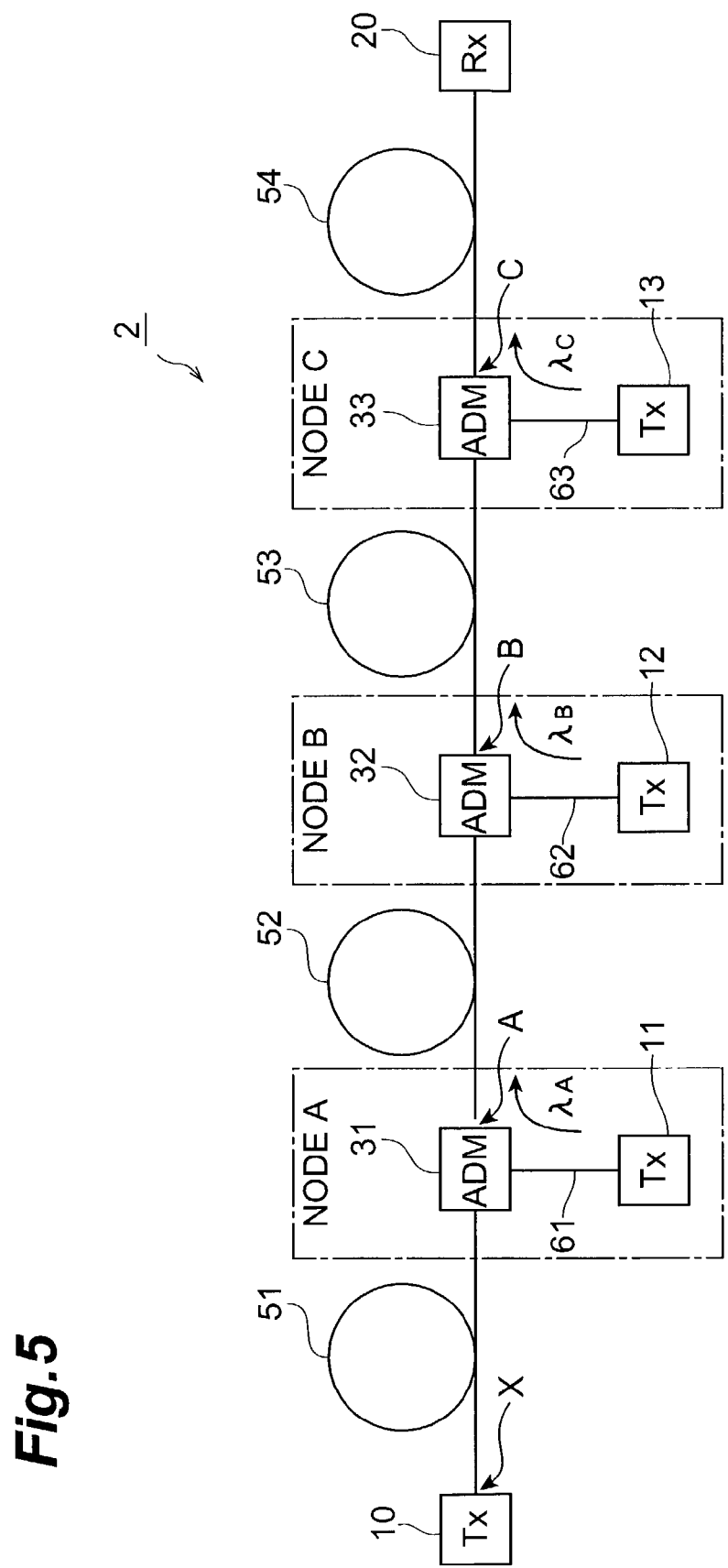
FIG. 5 is a view showing a structure of a second embodiment of an optical communication system according to the present invention.

FIG. 5 is a view showing a structure of the second embodiment of the optical communication system according to the present invention, and also in the structure shown in FIG. 5, a transmission path of signal is fixed, and an optimum signal channel is previously assigned to each of nodes A, B and C which add signals of predetermined channels to an optical transmission line.

In an optical communication system 2 according to the second embodiment, the nodes A, B and C are arranged on the optical transmission line provided between a transmitter 10 and a receiver 20. The node A includes an ADM 31 and a light source 11 for transmitting signals of the previously assigned optimum channel through the ADM 31 to the optical transmission line. The node B includes an ADM 32 and a light source 12 for transmitting signals of the previously assigned optimum channel through the ADM 32 to the optical transmission line. The node C includes an ADM 33 and a light source 13 for transmitting signals of the previously assigned optimum channel through the ADM 33 to the optical transmission line. An optical fiber 51 is provided between the transmitter 10 and the ADM 31, an optical fiber 52 is provided between the ADM 31 and the ADM 32, an optical fiber 53 is provided between the ADM 32 and the ADM 33, an optical fiber 54 is provided between the ADM 33 and the receiver 20, and the optical transmission path from the transmitter 10 to the receiver 20 is constituted by these optical fibers 51 to 54. Besides, an optical fiber 61 is provided between the light source 11 and the ADM 31, an optical fiber 62 is provided between the light source 12 and the ADM 32, and an optical fiber 63 is provided between the light source 13 and the ADM 33.

In the optical communication system 2 according to this second embodiment, signals outputted from the transmitter 10 propagate through the optical fibers 51 to 54 in sequence and reach the receiver 20. Alternatively, there is also a case where the signal outputted from the transmitter 10 is dropped by any one of the ADMs 31 to 33, and is received by a receiver (not shown). At the node A, signals outputted from the light source 11 propagate through the optical fiber 61 and reach the ADM 31, and they are sent from the ADM 31 to the optical fiber 52. Then, the signals from the light source 11 propagate through the optical fibers 52 to 54 in sequence and reach the receiver 20. On the other hand, at the node B, signals outputted from the light source 12 propagate through the optical fiber 62 and reach the ADM 32, and they are sent from the ADM 32 to the optical fiber 53. Then, the signals from the light source 12 propagate through the optical fibers 53 and 54 in sequence and reach the receiver 20. Further, at the node C, signals outputted from the light source 13 propagate through the optical fiber 63 and reach the ADM 33, and they are sent from the ADM 33 to the optical fiber 54. Then, the signals from the light source 13 propagate through the optical fiber 54 and reach the receiver 20.

As each of the optical fibers 51 to 54, a single mode optical fiber having a zero dispersion wavelength near a wavelength of 1.3 $\mu$m, a dispersion compensating optical fiber for compensating chromatic dispersion of the single-mode optical fiber at a wavelength 1.55 $\mu$m band, a dispersion-shifted optical fiber having a zero dispersion wavelength near a wavelength of 1.55 $\mu$m, or the like can be applied. From the viewpoint of enabling these silica-based optical fibers to transmit at the lowest loss and the viewpoint of easiness of loss compensation by an optical amplifier, it is preferable that each of the transmitter 10 and the light sources 11 to 13 outputs signals having a wavelength of 1.55 $\mu$m band.

Figure 6:
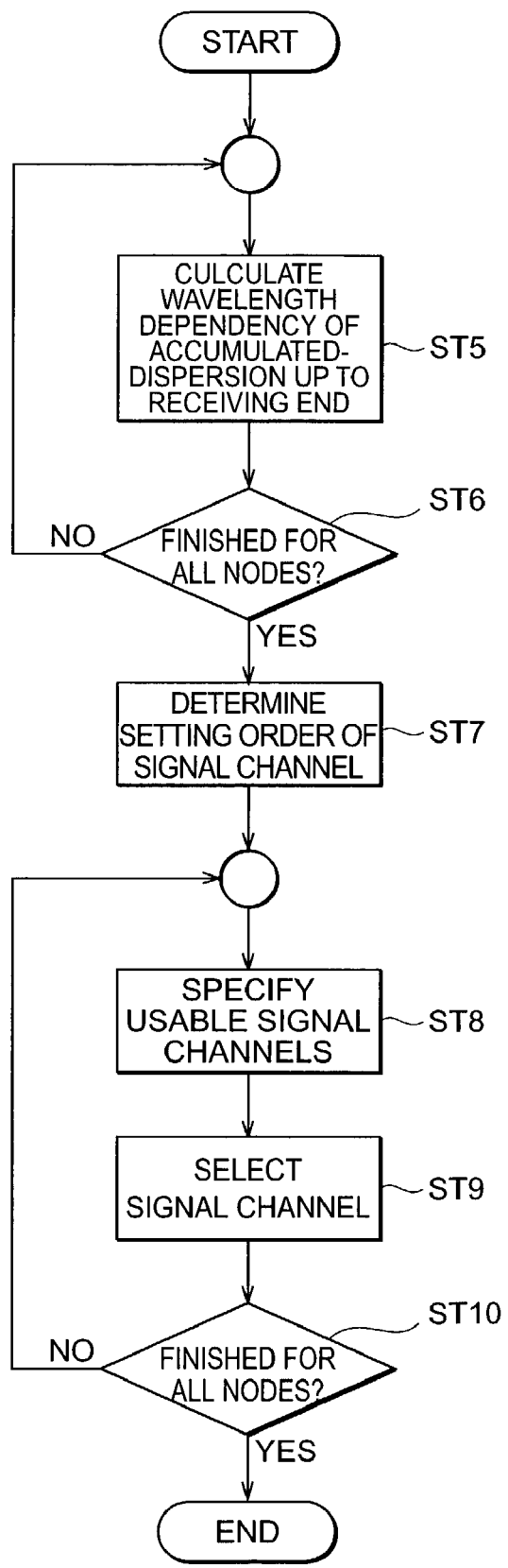
FIG. 6 is a flowchart for explaining a second embodiment of a method of assigning signal channels according to the present invention.
Figure 7:
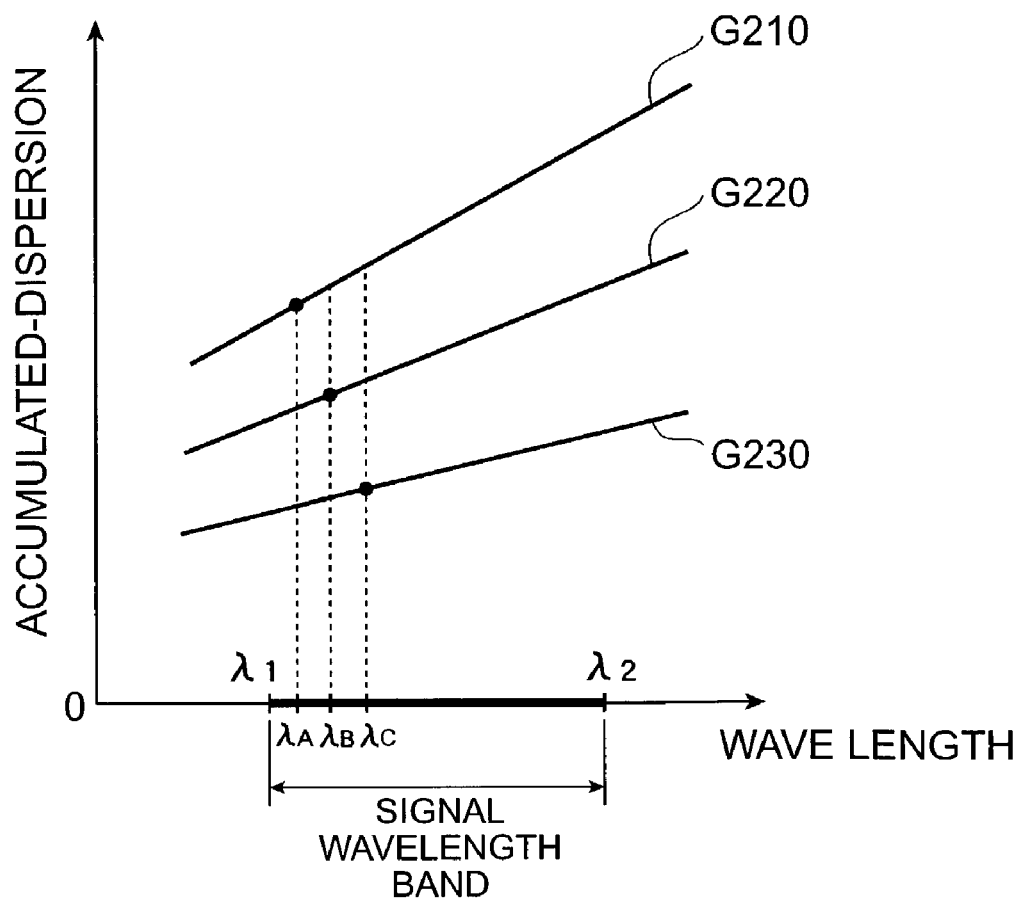
FIG. 7 is a graph for supplementally explaining the signal channel assigning method according to the second embodiment.

Incidentally, in FIG. 5, point A indicates a position of an output end in the ADM 31, point B indicates a position of an output end in the ADM 32, and point C indicates a position of an output end in the ADM 33. FIGS. 6 and 7 are a flowchart and a graph for explaining a signal channel assigning method (second embodiment of a signal channel assigning method according to the present invention) in the optical communication system 2 according to the second embodiment. In particular, in the graph shown in FIG. 7, a signal wavelength band of usable signal channels is (wavelength $\lambda_1$ to $\lambda_2$), a curve G210 indicates wavelength dependency of accumulated-dispersion from the point A to the receiver 20, a curve G220 indicates wavelength dependency of accumulated-dispersion from the point B to the receiver 20, and a curve G230 indicates wavelength dependency of accumulated-dispersion from the point C to the receiver 20.

As shown in FIG. 7, in the optical communication system 2, in the signal wavelength band (wavelength $\lambda_1$ to $\lambda_2$), optical fibers having suitable chromatic dispersion characteristics are applied as the optical fibers 51 to 54 constituting the optical transmission line from the transmitter 10 to the receiver 20. Thereby, the absolute value of accumulated-dispersion from the transmitter 10 to the receiver 20 becomes small, and deterioration of transmission characteristics of signals from the transmitter 10 to the receiver 20 is also effectively suppressed. However, the absolute value of accumulated-dispersion in the optical transmission line from the light source 11 through the ADM 31 to the receiver 20 is not necessarily small, the absolute value of accumulated-dispersion in the optical transmission line from the light source 12 through the ADM 32 to the receiver 20 is also not necessarily small, and the absolute value of accumulated-dispersion in the optical transmission line from the light source 13 through the ADM 33 to the receiver 20 is also not necessarily small.

Then, in this second embodiment, a channel of signals outputted from the light source 11 and added through the ADM 31 to the optical transmission line is previously assigned to the node A, a channel of signals outputted from the light source 12 and added through the ADM 32 to the optical transmission line is previously assigned to the node B, and a channel of signals outputted from the light source 13 and added through the ADM 33 to the optical transmission line is previously assigned to the node C, in accordance with the flowchart shown in FIG. 6.

First, prior to the signal channel assignment for the nodes A to C, wavelength dependency of each accumulated-dispersion from each of the point A, the point B and point C to the receiver 20 is calculated (steps ST5, ST6). On the basis of the wavelength dependency of each calculated accumulated-dispersion, the signal channel assignment is performed to the nodes in descending order of the absolute value of the accumulated-dispersion up to the receiver 20 (step ST7).

In the following explanation, it is assumed that as shown in FIG. 7, in the signal wavelength band, both the accumulated-dispersion and dispersion slope from each of the point A, the point B and the point C to the receiver 20 are positive, the absolute value of the accumulated-dispersion from the point A to the receiver 20 is largest, and the absolute value of the accumulated-dispersion from the point B to the receiver 20 and the absolute value of the accumulated-dispersion from the point C to the receiver 20 become small in this order. In this case, the signal channel assignment is performed in order of the node A, the node B and the node C.

In the signal channel assignment for the node A, as channel candidates of signals outputted from the light source 11 and added through the ADM 31 to the optical transmission line, signal channels which can be added by the ADM 31 are first specified (step ST8). Subsequently, from these specified candidates, a signal channel (wavelength $\lambda_A$) at which the absolute value of the accumulated-dispersion from the point A to the receiver 20 is smallest is selected as the signal channel to be added from the node A (step ST9). For example, as shown in FIG. 7, in the signal wavelength band, if both the accumulated-dispersion and the dispersion slope from the point A to the receiver 20 are positive, the channel of the shortest wavelength among the channels which can be added by the ADM 31 is assigned as the channel (wavelength $\lambda_A$) of the signal outputted from the light source 11 and added through the ADM 31 to the optical transmission line. If the signals of the lower limit wavelength $\lambda_1$ in the signal wavelength band can be added through the ADM 31, $\lambda_A = \lambda_1$.

Next, in the signal channel assignment for the node B, as channel candidates of signals outputted from the light source 12 and added through the ADM 32 to the optical transmission line, channels which can be add through the ADM 32 are specified (step ST8). From the specified candidates, a channel (wavelength $\lambda_B$) at which the absolute value of the accumulated-dispersion from the point B to the receiver 20 is smallest is selected as the signal channel to be added from the node B (step ST9). Incidentally, since the wavelength $\lambda_A$ is already assigned to the node A as the signal channel added at the point A, it can not be assigned to the node B as the signal channel to be added at the point B.

Finally, also in the signal channel assignment for the node C, as channel candidates of signals outputted from the light source 13 and added through the ADM 33 to the optical transmission line, channels which can be added by the ADM 33 are first specified (step ST8). Then, a channel (wavelength $\lambda_C$) at which the absolute value of the accumulated-dispersion from the point C to the receiver 20 is smallest is selected as the signal channel to be added from the node C (step ST9). Also in the signal channel assignment for the node C, since both the wavelengths $\lambda_A$ and $\lambda_B$ are already assigned to the node A and the node B as the signal channels added at the point A and the point B, they cannot be assigned to the node C as the signal channel to be added at the point C.

The assignment of the optimum signal channel as described above is performed to all nodes (step ST10). In the foregoing signal channel assignment, the wavelength dependency of each accumulated-dispersion from each of the nodes on the optical transmission line to the receiver 20 is calculated in advance, and on the basis of the wavelength dependency of each calculated accumulated-dispersion, the assignment of the optimum signal channel is performed to the node in descending order of the absolute value of the accumulated-dispersion up to the receiver 20. Thereby, the transmission characteristics of the signals outputted from each of the light sources 11 to 13 in the respective nodes A to C and reaching the receiver 20 are excellent as compared with the case where a combination of other signal channels is selected.

Figure 8:
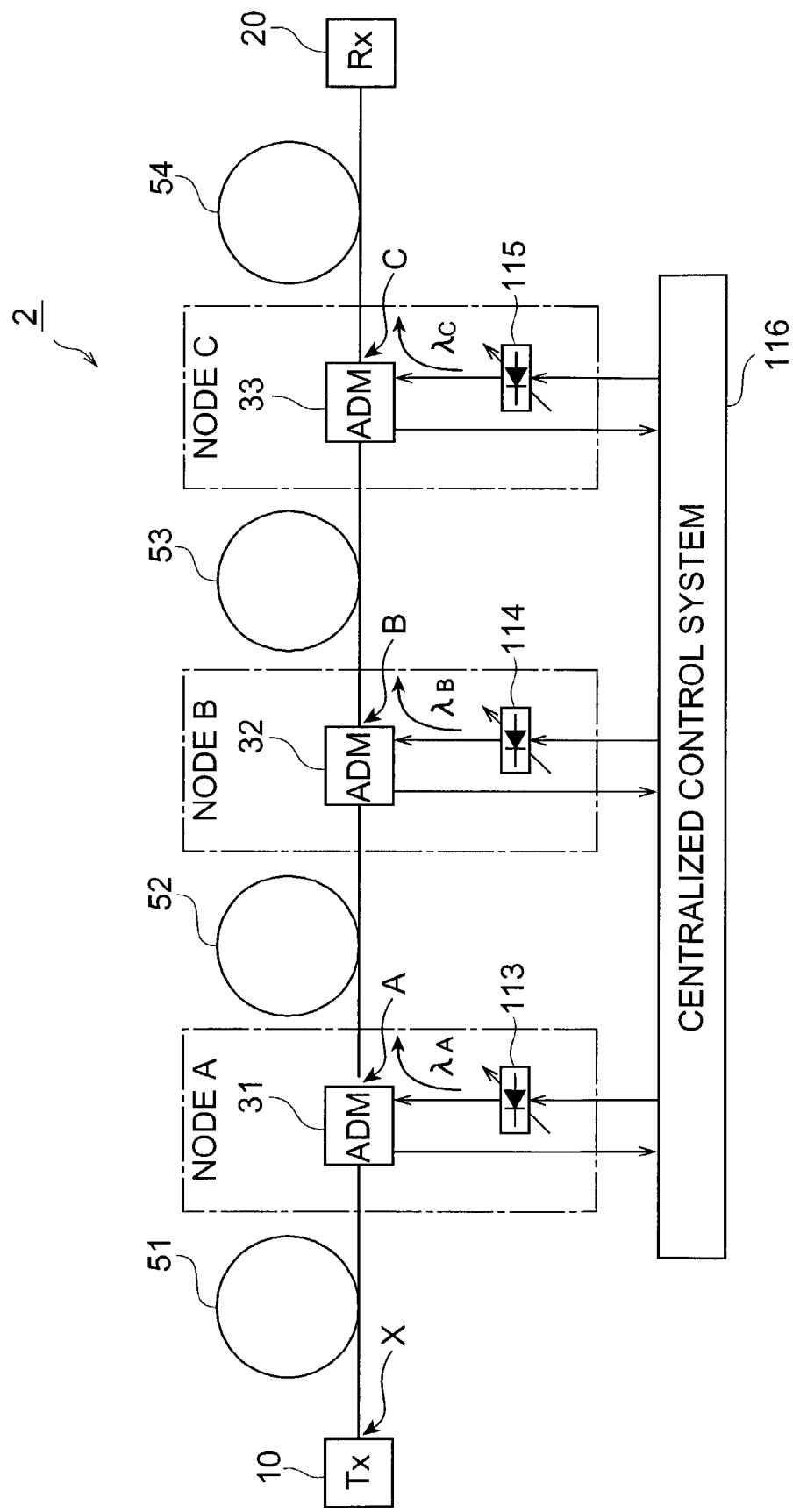
FIG. 8 is a view showing another structure of the optical communication system according to the second embodiment shown in FIG. 6.

Incidentally, with respect to this second embodiment, in the above signal channel assignment, although it is assumed that the transmission path of signal is fixed, it is also conceivable that the transmission path varies for each signal channel. In the latter case, it is necessary to assign the optimum signal channel dynamically to the respective nodes, and similarly to the foregoing first embodiment, when the structure of each of the nodes A to C is made the structure shown in FIGS. 4A and 4B, dynamic assignment of the optimum signal channel can be performed for each node. Besides, the dynamic assignment of signal channel in the second embodiment can be performed centralizedly. FIG. 8 is a view showing a structure for centralizedly performing the dynamic assignment of the optimum signal channel to the respective nodes in the optical communication system 2 according to the second embodiment.

In the optical communication system 2 shown in FIG. 8, a node A includes, as shown in FIG. 4B, an ADM 31 and a tunable light source 113 (as shown in FIG. 4A, a plurality of light sources outputting signals having wavelengths different from each other may be included). A node B includes, as shown in FIG. 4B, an ADM 32 and a tunable light source 114 (as shown in FIG. 4A, a plurality of light sources outputting signals having wavelengths different from each other may be included). Further, a node C includes, as shown in FIG. 4B, an ADM 33 and a tunable light source 115 (as shown in FIG. 4A, a plurality of light sources outputting signals having wavelengths different from each other may be included). The optical communication system 2 includes a centralized control system 116 for dynamically assigning optimum signal channels to these nodes A to C. As shown in FIG. 7, this centralized control system 116 also determines assignment order for signal channels as to the nodes A to C (steps ST5 to ST7), and assigns the optimum signal channels to the respective nodes in the determined order (steps ST8 to ST10).

(Third Embodiment of an Optical Communication System)

Figure 9:
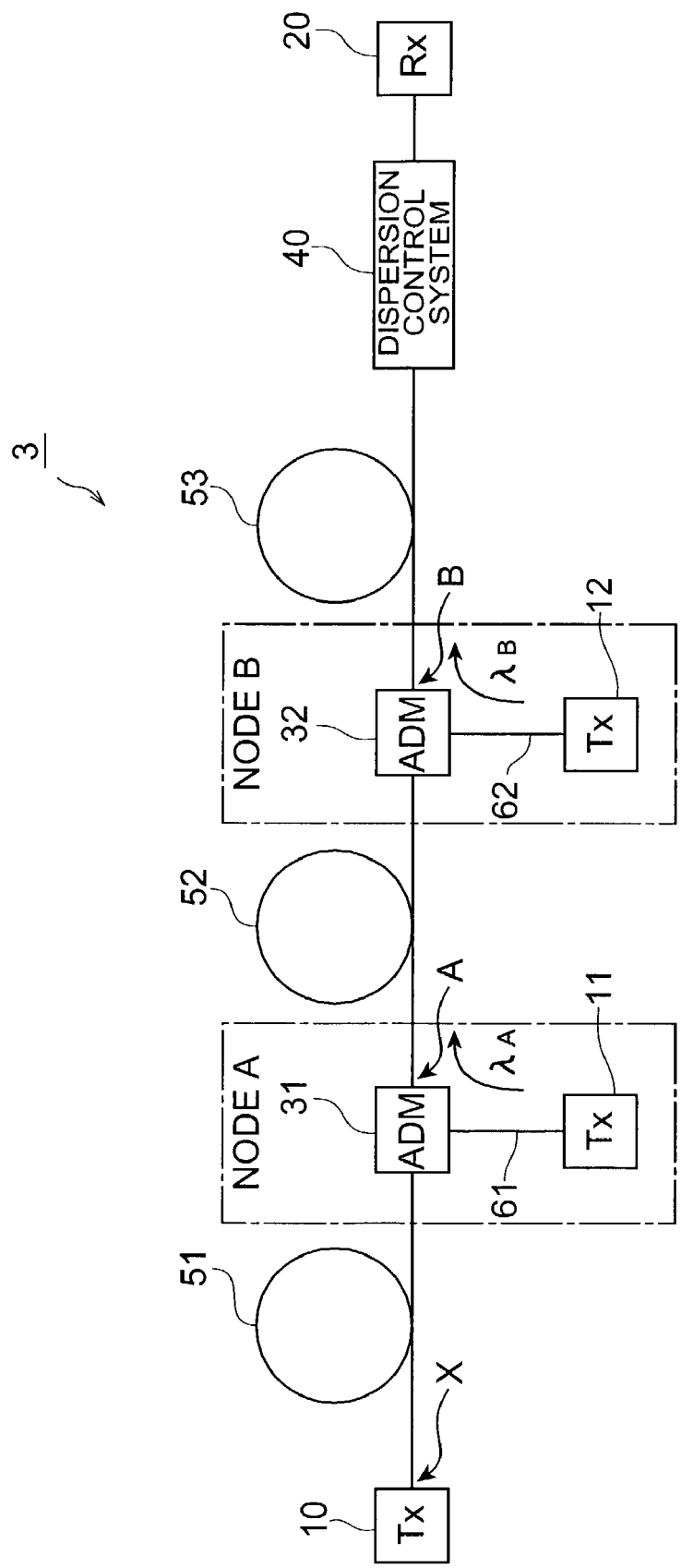
FIG. 9 is a view showing a structure of a third embodiment of an optical communication system according to the present invention.

Next, a third embodiment of an optical communication system according to the present invention will be described. FIG. 9 is a view showing a structure according to the third embodiment of the optical communication system according to the present invention. Incidentally, in an optical communication system 3 according to this third embodiment, both the signal channel assigning methods of the first and the second embodiments may be carried out.

In the optical communication system 3 according to the third embodiment, a node A, a node B, and a dispersion compensator 40 are arranged on an optical transmission line provided between a transmitter 10 and a receiver 20. The node A includes an ADM 31 and a light source 11 for sending signals of a previously assigned optimum channel through the ADM 31 to the optical transmission line. Similarly, the node B includes an ADM 32 and a light source 12 for sending signals of a previously assigned optimum channel through the ADM 32 to the optical transmission line. An optical fiber 51 is provided between the transmitter 10 and the ADM 31, an optical fiber 52 is provided between the ADM 31 and the ADM 32, an optical fiber 53 and the dispersion compensator 40 are provided between the ADM 32 and the receiver 20, and the optical transmission line from the transmitter 10 to the receiver 20 is constituted by these optical fibers 51 to 53. Further, an optical fiber 61 is provided between the light source 11 and the ADM 31, and an optical fiber 62 is provided between the light source 12 and the ADM 32.

In the optical communication system 3 according to the third embodiment, signals outputted from the transmitter 10 propagate through the optical fibers 51 to 53 and the dispersion compensator 40 in sequence and reach the receiver 20. Alternatively, there is also a case where the signals outputted from the transmitter 10 are dropped by the ADM 31 or the ADM 32, and are received by a receiver (not shown). At the node A, signals outputted from the light source 11 propagate through the optical fiber 61 and reach the ADM 31, and they are sent from the ADM 31 to the optical fiber 52. Then, the signals from the light source 11 propagate through the optical fibers 52 and 53 and the dispersion compensator 40 in sequence and reach the receiver 20. On the other hand, at the node B, signals outputted from the light source 12 propagate through the optical fiber 62 and reach the ADM 32, and they are sent from the ADM 32 to the optical fiber 53. Then, the signals from the light source 12 propagate through the optical fiber 53 and the dispersion compensator 40 in sequence and reach the receiver 20.

As each of the optical fibers 51 to 53, a single mode optical fiber having a zero dispersion wavelength near a wavelength of 1.3 μm, a dispersion compensating optical fiber for compensating chromatic dispersion of the single-mode optical fiber at a wavelength of 1.55 μm band, a dispersion-shifted optical fiber having a zero dispersion wavelength near a wavelength of 1.55 μm, or the like can be applied. From the viewpoint of enabling these silica-based optical fibers to transmit at the lowest loss and the viewpoint of easiness of loss compensation by an optical amplifier, it is preferable that each of the transmitter 10 and the light sources 11 and 12 outputs signals having a wavelength of 1.55 μm band.

Figure 10:
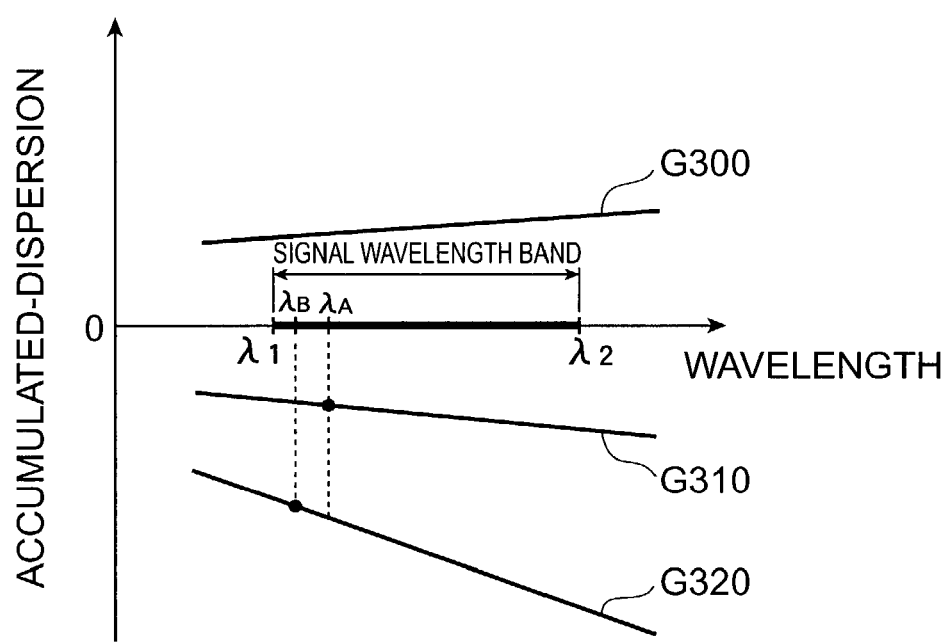
FIG. 10 is a graph for supplementally explaining the signal channel assigning method in the optical communication system according to the third embodiment.

Incidentally, in FIG. 9, point X indicates a position of an output end in the transmitter 10, point A indicates a position of an output end in the ADM 31, and point B indicates a position of an output end in the ADM 32. FIG. 10 is a view for supplementally explaining a signal channel assigning method in the optical communication system 3 according to the third embodiment. In the graph of FIG. 10, a wavelength band of usable signal channels is $\lambda_1$ to $\lambda_2$, a graph G300 indicates wavelength dependency of accumulated-dispersion from the point X to the receiver 20, a graph G310 indicates wavelength dependency of accumulated-dispersion from the point A to the receiver 20, and a graph G320 indicates wavelength dependency of accumulated-dispersion from the point B to the receiver 20.

As shown in FIG. 10, in the optical communication system 3, in the signal wavelength band (wavelength $\lambda_1$ to $\lambda_2$), optical fibers having suitable chromatic dispersion characteristics are applied as the optical fibers 51 to 53 constituting the optical transmission line and the dispersion compensator 40. Thereby, the absolute value of accumulated-dispersion in the optical transmission line from the transmitter 10 to the receiver 20 becomes small, and deterioration of transmission characteristics of signals from the transmitter 10 to the receiver 20 is also effectively suppressed. However, the absolute value of accumulated-dispersion in the optical transmission line from the light source 11 through the ADM 31 to the receiver 20 is not necessarily small, and the absolute value of accumulated-dispersion in the optical transmission line from the light source 12 through the ADM 32 to the receiver 20 is also not necessarily small.

Then, in this third embodiment, a channel of signals outputted from the light source 11 and added through the ADM 31 to the optical transmission line is assigned to the node A, and a channel of signals outputted from the light source 12 and added through the ADM 32 to the optical transmission line is assigned to the node B, as described below. Incidentally, in the following explanation, in accordance with the signal channel assigning method (FIG. 6) according to the second embodiment, an operation in which optimum signal channels are assigned to the respective nodes A and B in advance will be described.

That is, prior to the signal channel assignment for the nodes A and B, wavelength dependency of each accumulated-dispersion from each of the point A and the point B to the receiver 20 is calculated (steps ST5, ST6). On the basis of the calculated wavelength dependency of each calculated accumulated-dispersion, the assignment of the signal channels is performed to the nodes in descending order of the absolute value of the accumulated-dispersion up to the receiver 20 (step ST7). In the following explanation, it is assumed that as shown in FIG. 10, in the signal wavelength band, both the accumulated-dispersion and dispersion slope from each of the point A and the point B to the receiver 20 are negative, and the absolute value of the accumulated-dispersion from the point A to the receiver 20 is smaller than the absolute value of the accumulated-dispersion from the point B to the receiver 20. In this case, the signal channel assignment is performed in order of the node A and the node B.

First, in the signal channel assignment for the node B, as channel candidates of signals outputted from the light source 12 and added through the ADM 32 to the optical transmission line, signal channels which can be added by the ADM 32 are first specified (step ST8). Subsequently, from these specified candidates, a signal channel (wavelength $\lambda_B$) at which the absolute value of the accumulated-dispersion from the point B to the receiver 20 is smallest is selected as the signal channel to be added from the node B (step ST9). For example, as shown in FIG. 10, in the signal wavelength band, if both the accumulated-dispersion and the dispersion slope from the point B to the receiver 20 are negative, the channel of the shortest wavelength among the channels which can be added by the ADM 32 is assigned as the channel (wavelength $\lambda_B$) of the signals outputted from the light source 12 and added through the ADM 32 to the optical transmission line. If the signals of the lower limit wavelength $\lambda_1$ of the signal wavelength band can be added through the ADM 32, $\lambda_B = \lambda_1$.

Next, in the signal channel assignment for the node A, as channel candidates of signals outputted from the light source 11 and added through the ADM 31 to the optical transmission line, channels which can be added through the ADM 31 are specified (step ST8). From the specified candidates, a channel (wavelength $\lambda_A$) at which the absolute value of the accumulated-dispersion from the point A up to the receiver 20 is smallest is selected as the signal channel to be added from the node A (step ST9). Incidentally, since the wavelength $\lambda_B$ is already assigned to the node B as the signal channel to be added at the point B, it can not be assigned to the node A as the signal channel to be added at the point A.

The assignment of the optimum signal channel as described above is performed to all nodes (step ST10). In the foregoing signal channel assignment, the wavelength dependency of each accumulated-dispersion from each of the nodes on the optical transmission line to the receiver 20 is calculated in advance, and on the basis of the wavelength dependency of each calculated accumulated-dispersion, the assignment of the optimum signal channel is performed to the node in descending order of the absolute value of the accumulated-dispersion up to the receiver 20. Thereby, transmission characteristics of the signals outputted from each of the light sources 11 to 12 in the respective nodes A to B and reaching the receiver 20 are excellent as compared with the case where a combination of other signal channels is selected.

Figure 11:
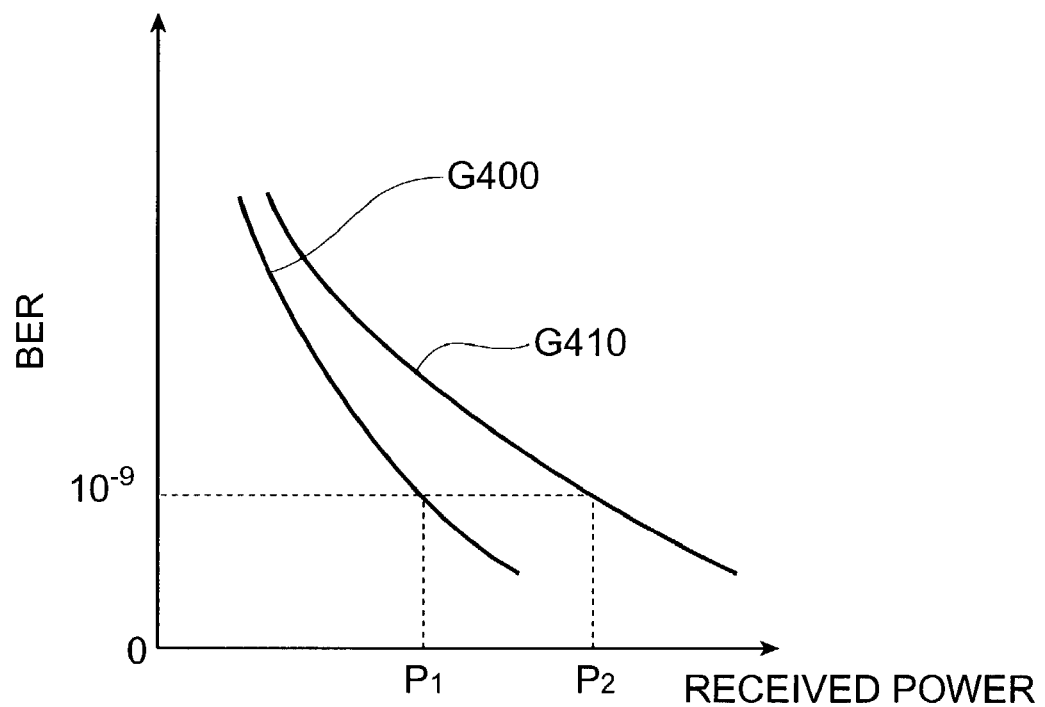
FIG. 11 is a graph showing the relation between bit error rate and necessary reception power for a case where the absolute value of accumulated-dispersion is small and for a case where it is large.

In particular, in the third embodiment, since the dispersion compensator 40 is provided between the point B and the receiver 20, not only the absolute value of the accumulated-dispersion from the transmitter 10 (point X) to the receiver 20 is made small, but also the absolute value of the accumulated-dispersion from the light source 1 (point A) to the receiver 20 is made small. FIG. 11 is a graph showing the relation between bit error rate (BER) and necessary receiving power with respect to a case (indicated by a curve G400) where the absolute value of the accumulated-dispersion is small and a case (indicated by a curve G410) where it is large. As shown in this graph, with respect to the signals added at a node relatively far from the receiver 20, since the absolute value of the accumulated-dispersion up to the receiver 20 is small, even if the loss is increased to some degree during transmission through the optical transmission line and the reception signal power at the receiver 20 becomes small, a reception margin is sufficiently secured. On the other hand, with respect to signals added at a node relatively close to the receiver 20, since the reception signal power at the receiver 20 is sufficiently large, even if the absolute value of the accumulated-dispersion up to the receiver 20 is large, a reception margin is sufficiently secured as well.

Incidentally, in the above signal channel assignment, although the description has been made on the case where the transmission path of signal is fixed and the optimum signal channels are assigned to the respective nodes in advance, also in this third embodiment, the optimum signal channels may be dynamically assigned to the respective nodes. In the latter case, in the respective nodes, as shown in FIGS. 4A and 4B, the optimum signal channel may be assigned individually by a node control system provided in each of the nodes, or as shown in FIG. 8, the optimum signal channel can also be assigned to each node by a centralized control system.

As described above, in accordance with the present invention, since the signal channel at which the absolute value of the accumulated-dispersion up to the receiving end is smallest among signal channels which can be added, is assigned to every node, it becomes possible to effectively improve the transmission characteristics of the added signals as compared with the case where any one of other channels is selected.

What is claimed is:

1. An optical communication system comprising an optical transmission line disposed between a transmitting end and a receiving end, for transmitting signals of plural channels, and one or more nodes each arranged at a predetermined position in said optical transmission line and adding signals of a predetermined channel to said optical transmission line, each of said nodes including a transmitter for outputting the signals and a structure for introducing the signals to said transmission line without compensating for the signals from the transmitter,
   wherein among signal channels which can be added to said optical transmission line, each of said nodes adds signals of a signal channel at which an absolute value of previously calculated accumulated-dispersion from said node itself to said receiving end becomes smallest, to said optical transmission line.

2. An optical communication system according to claim 1, further comprising a dispersion compensator arranged at a predetermined position of said optical transmission line.

3. An optical communication system comprising an optical transmission line disposed between a transmitting end and a receiving end, for transmitting signals of plural channels, and one or more nodes each arranged at a predetermined position of said optical transmission line and adding signals of a predetermined channel to said optical transmission line,
   wherein among signal channels which can be added to said optical transmission line, each of said nodes adds signals of a signal channel at which an absolute value of previously calculated accumulated-dispersion from said node itself to said receiving end becomes smallest, to said optical transmission line, and wherein each of said nodes includes a node control system which specifies signal channels which can be added to the optical transmission line, and among said specified signal channels, assigns a signal channel at which the absolute value of accumulated-dispersion from said associated node to said receiving end becomes smallest, to said associated node.

4. An optical communication system comprising an optical transmission line disposed between a transmitting end and a receiving end, for transmitting signals of plural channels, and one or more nodes each arranged at a predetermined position of said optical transmission line and adding signals of a predetermined channel to said optical transmission line,
   wherein among signal channels which can be added to said optical transmission line, each of said nodes adds signals of a signal channel at which an absolute value of previously calculated accumulated-dispersion from said node itself to said receiving end becomes smallest, to said optical transmission line
   the optical communication system further comprising a centralized control system which calculates wavelength dependency of accumulated-dispersion up to said receiving end for each of said nodes, and assigns optimum signal channels to said nodes in descending order of the absolute value of the accumulated-dispersion,
   wherein said centralized control system specifies signal channels which can be added to said optical transmission line for every node selected as an assignment object, and among said specified signal channels, assigns a signal channel at which the absolute of the accumulated-dispersion from said selected node itself to said receiving end becomes smallest, to said selected node.

5. A method of assigning signal channels which assigns a predetermined signal channel to be added to an optical transmission line to each of nodes in an optical communication system, said optical communication system comprising: said optical transmission line disposed between a transmitting end and a receiving end and transmitting signals of plural channels; and one or more nodes each arranged at a predetermined position of said optical transmission line and adding signals of a predetermined channel to said optical transmission line, each of said nodes including a transmitter for outputting the signals and a structure for introducing the signals to said transmission line, without compensating for the signals from said transmitter, said method comprising the steps of:
   calculating accumulated-dispersion from each of said nodes to said receiving end; and
   assigning, among signal channels which can be added to said optical transmission line, a signal channel at which an absolute value of previously calculated accumulated-dispersion from said node itself to said receiving end becomes the smallest.

6. A method of assigning signal channels which assigns a predetermined signal channel to be added to an optical transmission line to each of nodes in an optical communication system, said optical communication system comprising: said optical transmission line disposed between a transmitting end and a receiving end and transmitting signals of plural channels; and one or more nodes each arranged at a predetermined position of said optical transmission line and adding signals of a predetermined channel to said optical transmission line, said method comprising the steps of:
   calculating wavelength dependency of accumulated-dispersion from each of said nodes to said receiving end:
   successively selecting said nodes as an assignment object in descending order of an absolute value of the accumulated-dispersion thereof:
   specifying signal channels which can be added to said optical transmission line for every node selected as said assignment object; and
   assigning, among said specified signal channels, a signal channel at which an absolute value of the accumulated-dispersion from said selected node to said receiving end becomes the smallest.

* * * * *